United States Patent

Ogura et al.

(10) Patent No.: US 9,280,021 B2
(45) Date of Patent: Mar. 8, 2016

(54) LIQUID CRYSTAL DISPLAY APPARATUS

(75) Inventors: Kenji Ogura, Kanagawa (JP); Hironao Tanaka, Kanagawa (JP); Hidemasa Yamaguchi, Kanagawa (JP)

(73) Assignee: JAPAN DISPLAY INC., Tokyo (JP)

( * ) Notice: Subject to any disclaimer, the term of this patent is extended or adjusted under 35 U.S.C. 154(b) by 476 days.

(21) Appl. No.: 12/922,575

(22) PCT Filed: Mar. 27, 2009

(86) PCT No.: PCT/JP2009/056274
§ 371 (c)(1),
(2), (4) Date: Sep. 14, 2010

(87) PCT Pub. No.: WO2009/119798
PCT Pub. Date: Oct. 1, 2009

(65) Prior Publication Data
US 2011/0012821 A1    Jan. 20, 2011

(30) Foreign Application Priority Data

Mar. 28, 2008  (JP) .................... 2008-085497

(51) Int. Cl.
G09G 3/36       (2006.01)
G02F 1/1343     (2006.01)
G02F 1/1337     (2006.01)
G02F 1/1362     (2006.01)

(52) U.S. Cl.
CPC .... G02F 1/134336 (2013.01); G02F 1/133784 (2013.01); G02F 1/136286 (2013.01); G02F 2001/134372 (2013.01)

(58) Field of Classification Search
CPC ................ G02F 1/134309; G02F 1/134336; G02F 1/134363; G02F 1/133707
See application file for complete search history.

(56) References Cited

U.S. PATENT DOCUMENTS

| 7,486,351 | B2 * | 2/2009 | Itou et al. ................. 349/99 |
| 7,675,579 | B2 * | 3/2010 | Suzuki ..................... 349/4 |
| 7,872,622 | B2 * | 1/2011 | Kim ......................... 345/87 |
| 2003/0090608 | A1 * | 5/2003 | Kim et al. ................. 349/110 |
| 2004/0263748 | A1 * | 12/2004 | Park et al. ................. 349/141 |
| 2006/0066798 | A1 * | 3/2006 | Hwang et al. ............. 349/141 |
| 2006/0290869 | A1 * | 12/2006 | Suzuki ..................... 349/143 |
| 2007/0171319 | A1 * | 7/2007 | Fujita et al. ............... 349/43 |

(Continued)

FOREIGN PATENT DOCUMENTS

| JP | 07-134301 | 5/1995 |
| JP | 10-170924 | 6/1998 |

(Continued)

OTHER PUBLICATIONS

Japanese Office Action issued on Sep. 11, 2012, in connection with counterpart JP Application No. 2008-085497.

(Continued)

*Primary Examiner* — Alexander Eisen
*Assistant Examiner* — Nan-Ying Yang
(74) *Attorney, Agent, or Firm* — Dentons US LLP

(57) ABSTRACT

Each of branch portions 62*ae* of a pixel electrode 62*a* and inclined portions S1*k* of data lines S1 extends in a direction different from an x direction and a y direction in a pixel region PA and inclined with respect to the y direction. Further, a liquid crystal layer 203 is orientated in a direction different from the x direction and the y direction in the pixel region PA and inclined with respect to the y direction.

9 Claims, 10 Drawing Sheets

(56) References Cited

U.S. PATENT DOCUMENTS

| | | | |
|---|---|---|---|
| 2007/0229749 A1* | 10/2007 | Kaneko et al. | ............... 349/141 |
| 2009/0115712 A1 | 5/2009 | Morimoto et al. | |

FOREIGN PATENT DOCUMENTS

| | | |
|---|---|---|
| JP | 2000-292782 | 10/2000 |
| JP | 2005-208567 | 8/2005 |
| JP | 2005-338264 | 12/2005 |
| JP | 2007-226200 | 9/2007 |
| JP | 2007-264231 | 10/2007 |
| JP | 2009-015204 | 1/2009 |
| JP | 2009-115834 | 5/2009 |
| JP | 2009-115841 | 5/2009 |
| KR | 10-2004-0043485 | 5/2004 |
| KR | 10-2005-0068262 | 7/2005 |
| KR | 10-2007-0037146 | 4/2007 |

OTHER PUBLICATIONS

International Search Report dated Jun. 9, 2009.
Korean Office Examination Report issued in connection with related Korean Patent Application No. 10-2010-7020711 dated Oct. 31, 2014 with English translation.

* cited by examiner

F I G . 4
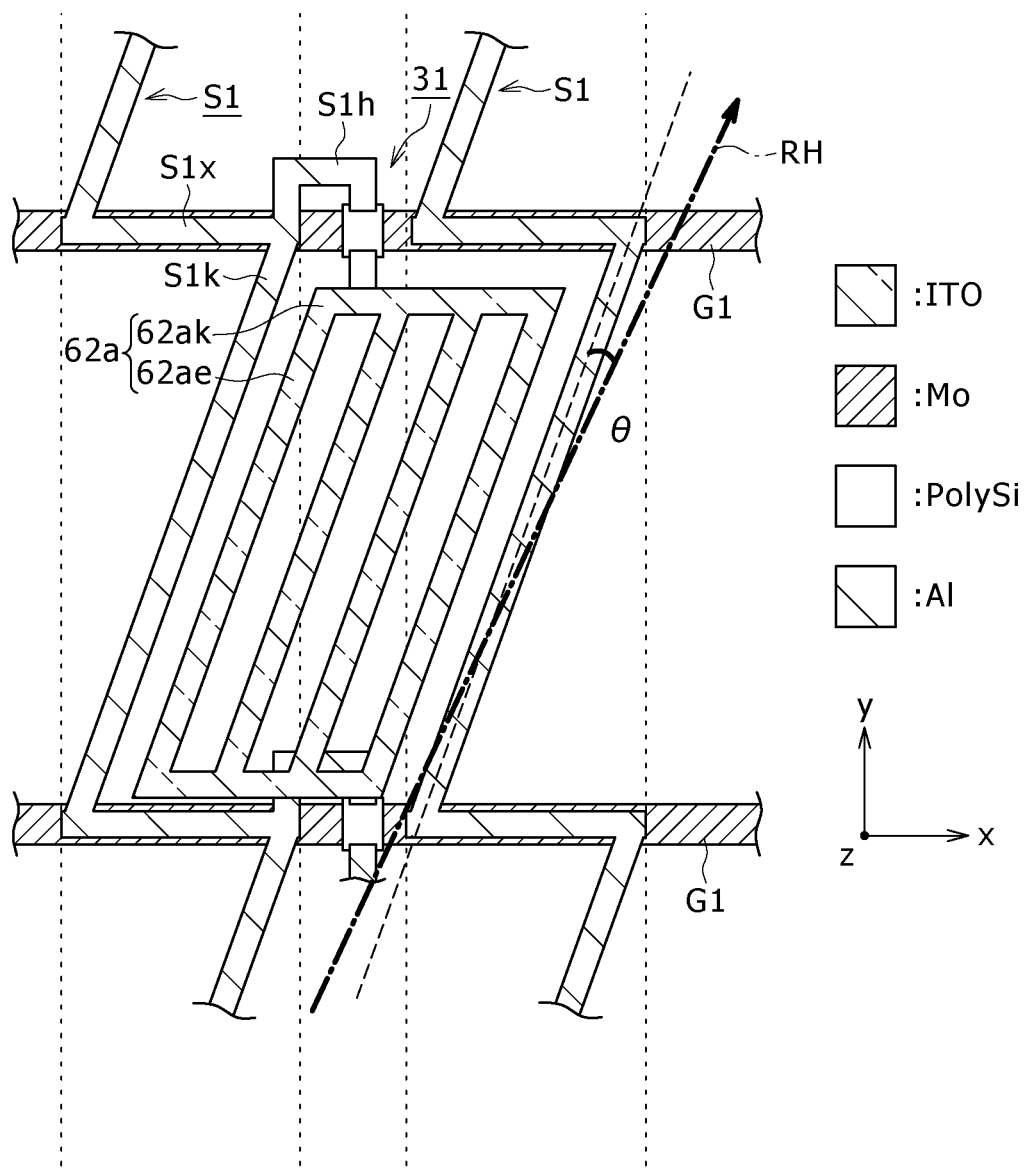

LIQUID CRYSTAL DISPLAY APPARATUS

TECHNICAL FIELD

This invention relates to a liquid crystal display apparatus wherein a transverse electric field is applied to a liquid crystal layer in a pixel region in which a plurality of pixels are provided in a matrix on a liquid crystal panel such that an image is displayed in the pixel region with light emitted through the liquid crystal layer and a polarizing plate.

BACKGROUND ART

A liquid crystal display apparatus includes a liquid crystal panel wherein a liquid crystal layer is encapsulated between a pair of substrates as a display panel. The liquid crystal panel is, for example, of the transmission type wherein it modulates illuminating light emitted from an illumination apparatus such as a backlight provided on the rear face of the liquid crystal panel and transmits the modulated light therethrough. Then, display of an image is carried out on the front face of the liquid crystal panel with the modulated illuminating light.

The liquid crystal panel built in the liquid crystal display apparatus is, for example, of the active matrix type and includes a TFT array substrate having a pixel region in which a plurality of thin film transistors (TFTs) which function as pixel switching elements are formed, an opposing substrate opposing so as to face the TFT array substrate, and a liquid crystal layer provided between the TFT array substrate and the opposing substrate.

In the liquid crystal panel of the active matrix type, an electric field produced between a pixel electrode and a common electrode by inputting a potential to the pixel electrode from a pixel switching element is applied to the liquid crystal layer to vary the orientation of liquid crystal molecules of the liquid crystal layer. By this, the transmission factor of light to be transmitted through the pixel is controlled to modulate the light to pass therethrough to carry out display of an image.

In such a liquid crystal panel as just described, in addition to a TN (Twisted Nematic) mode, an ECB (Electrically Controlled Birefringence) mode, a vertical orientation mode and so forth, various display modes such as an IPS (In-Plane-Switching) type and an FFS (Fringe Field Switching) type are known as modes wherein a transverse electric field is applied to a liquid crystal layer (refer to, for example, Patent Document 1 and Patent Document 2). In the modes wherein a transverse electric field is applied, it has been proposed to apply dual domains (refer to, for example, Patent Document 3).

Patent Document 1: Japanese Patent Laid-Open No. Hei 10-170924
Patent Document 2: Japanese Patent Laid-Open No. 2007-226200
Patent Document 3: Japanese Patent Laid-Open No. 2007-264231

DISCLOSURE OF INVENTION

A liquid crystal display apparatus is incorporated, for example, in a portable mobile apparatus. In such an instance, it is necessitated to configure the liquid crystal display apparatus such that an image displayed thereon can be visually observed by a user in any of a landscape (horizontally long) state wherein a pixel region of a rectangular shape on which an image is to be displayed is long in an x direction and a portrait (vertically long) state wherein the pixel region is long in a y direction.

However, for example, where a user is outdoors, the user sometimes visually observes an image on the screen through polarizing sunglasses. Therefore, in the case wherein the liquid crystal display apparatus is of the transverse electric field type such as the IPS type or the FFS type described above, the visibility sometimes drops in response to an angle when the user visually observes the screen.

FIG. 11 is a plan view schematically showing part of pixels provided in a pixel region of a liquid crystal display apparatus of the FFS type. In FIG. 11, part of a pixel on a TFT array substrate is shown.

As shown in FIG. 11, on the TFT array substrate, a pixel switching element 31, a pixel electrode 62a, a data line S1 and a gate line G1 are formed. In addition, though not shown, a common electrode is provided in an opposing relationship to the pixel electrode 62a on the TFT array substrate.

Here, the pixel switching element 31 is, for example, a bottom gate type TFT as shown in FIG. 11.

Further, the pixel electrode 62a is formed in a comb-tooth shape on an xy plane defined by an x direction and a y direction which define the pixel region as shown in FIG. 11. In particular, as shown in FIG. 11, the pixel electrode 62a has a trunk portion 62ak and a branch portion 62ae, and the trunk portion 62ak extends in the x direction and a plurality of such branch portions 62ae extend in the y direction. The pixel electrode 62a is electrically connected to the drain electrode of the pixel switching element 31.

Further, the data line S1 extends in the y direction as shown in FIG. 11 and is electrically connected to the source electrode of the pixel switching element 31.

The gate line G1 extends in the x direction as shown in FIG. 11 and is electrically connected to the gate electrode of the pixel switching element 31.

As shown in FIG. 11, the liquid crystal layer is subject to an orientation process by carrying out a rubbing process setting the rubbing direction RH to a direction inclined by a predetermined angle θ (for example, 5°) with respect to a direction in which the branch portion 62ae of the pixel electrode 62a and the data line S1 extend in the pixel region PA.

As described above, in the case of the transverse electric field type such as the FFS type, the pixel electrode 62a has a comb-tooth shape, and the plural branch portions 62ae thereof extend in the y direction. Therefore, since the transmission axis along which light is transmitted through the liquid crystal panel is determined depending upon the direction in which the branch portions 62ae extend, when the pixel region of a rectangular shape is placed into a state in the landscape state, for example, the transmission axis of the pixel region extends along the longitudinal direction. On the other hand, when the pixel region is placed into a state in the portrait state, for example, the transmission axis extends along a lateral direction of the screen of a rectangular shape.

The polarizing sunglasses include polarizing elements having a transmission axis along the x direction or the y direction such that a user will visually observe an image through the polarizing elements.

Therefore, when a state of one of the landscape state and the portrait state is entered, the transmission axis of the liquid crystal panel and the transmission axis of the polarizing sunglasses are sometimes much different from each other. Therefore, it sometimes becomes difficult for the user to visually observe an image displayed on the liquid crystal panel.

Accordingly, as described hereinabove, the visibility of the screen sometimes deteriorates in response to the angle when the user visually observes the screen.

In order to eliminate this fault, a method of disposing a phase difference plate on a face of a liquid crystal panel is available. In this instance, however, the fabrication cost increases, and light is absorbed by the phase difference plate. Therefore, since the light transmittance drops generally, the image quality sometimes drops.

Further, by setting the transmission axis of the liquid crystal panel with respect to the sides of the screen of a rectangular shape, the visibility of the polarizing sunglasses can be improved. For example, the angle of the direction in which the branch portions of the comb-tooth electrode described hereinabove extend is inclined at an angle of 45° with respect to the sides of the screen. However, when the branch portions of the comb-tooth electrode are inclined, domains through which light is not transmitted sometimes increase, resulting in decrease of the light transmittance, and the image quality sometimes drops.

Further, where data lines are connected in the pixel region in which the pixels are disposed in the x direction and the y direction so as to connect to pixels juxtaposed in a direction inclined with respect to the y direction in order to incline the transmission axis of the liquid crystal panel with respect to the y direction, a scanning signal and a data signal produced so as to be displayed using the line sequential system cannot be used as they are, but it becomes necessary to separately carry out a signal process for converting the signals. Therefore, such faults as increase of the fabrication cost and deterioration of the image quality by delay by the signal process sometimes occur, and the visibility drops.

In this manner, it sometimes is difficult to improve the visibility due to occurrence of such faults as described above.

Accordingly, the present invention provides a liquid crystal display apparatus which can improve the visibility.

According to the present invention, there is provided a liquid crystal display apparatus wherein, in a pixel region of a liquid crystal panel in which a plurality of pixels are provided in a matrix in a first direction and a second direction perpendicular to the first direction, a pixel electrode and a common electrode apply a transverse electric field to a liquid crystal layer such that an image is displayed in the pixel region with light emitted through the liquid crystal layer and a polarizing plate, wherein the liquid crystal panel has a plurality of first wire lines disposed in a spaced relationship from each other in the second direction with regard to the plural pixels so as to define the plural pixels juxtaposed in the second direction, and a plurality of second wire lines disposed in a spaced relationship from each other in the first direction with regard to the plural pixels so as to define the plural pixels juxtaposed in the first direction; each of the second wire lines includes an inclined portion extending in a direction different from the first direction and the second direction in the pixel region and inclined with respect to the second direction; the pixel electrode includes a trunk portion extending in the first direction, and a branch portion connected to the trunk portion and extending in a direction different from the first direct and the second direction in the pixel region and inclined with respect to the second direction, and a plurality of such branch portions are provided in a spaced relationship from each other in the first direction; and the liquid layer includes liquid crystal molecules orientated in an inclined relationship with respect to the first direction or the second direction in the pixel region.

Preferably, the image displayed with the light emitted through the liquid crystal layer and the polarizing plate in the pixel region is visually observed through a polarizing element whose transmission axis coincides with the first direction or the second direction.

Preferably, the branch portions extend along a direction along which the inclined portions of the second wire lines extend.

Preferably, each of the inclined portions of the second wire lines and the branch portions extends in a direction inclined within an angular range equal to or greater than 2° but equal to or smaller than 45° with respect to the second direction in the pixel region.

Preferably, each of the inclined portions of the second wire lines and the branch portions extends in a direction inclined at the angle of 45° with respect to the second direction in the pixel region.

Preferably, each of the second wire lines includes a bent portion bent like a staircase in the first direction and the second direction so as to be spaced away from another second wire line provided so as to correspond to another adjacent pixel in the pixel region.

Preferably, each of the inclined portions of the second wire lines includes a first inclined portion extending in a third direction different from the first direction and the second direction, and a second inclined portion extending in a fourth direction different from the first direction, second direction and third direction, and the first inclined portion and the second inclined portion are formed so as to correspond to one pixel in the pixel region.

Preferably, each of the inclined portions of the second wire lines includes a first inclined portion extending in a third direction different from the first direction and the second direction, and a second inclined portion extending in a fourth direction different from the first direction, second direction and third direction, and the first inclined portion and the second inclined portion are disposed alternately in the plural pixels juxtaposed in the second direction in the pixel region.

In the present invention, each of the branch portions of the pixel electrode and the inclined portions of the second wire lines extends in the direction different from the first direction and the second direction in the pixel region and inclined with respect to the second direction. Further, the liquid crystal layer is orientated in the direction different from the first direction and the second direction in the pixel region and inclined with respect to the second direction.

According to the present invention, a liquid crystal display apparatus which can improve the visibility can be provided.

BRIEF DESCRIPTION OF THE DRAWINGS

FIG. 4 is a plan view of a subpixel of the pixel P provided in the pixel region PA in the embodiment 1 according to the present invention.

BEST MODE FOR CARRYING OUT THE INVENTION

An example of embodiments of the present invention is described.

Embodiment 1

Configuration of the Liquid Crystal Display Apparatus

Figure 1:
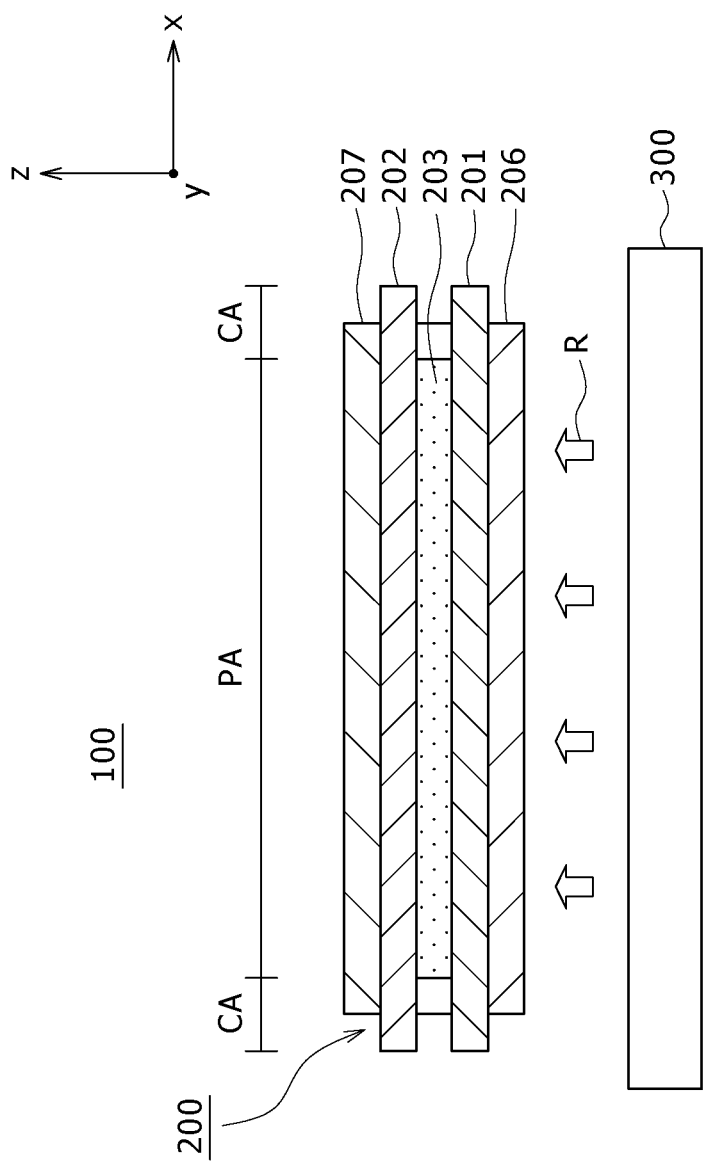
FIG. 1 is a sectional view showing a configuration of a liquid crystal display apparatus 100 in an embodiment 1 according to the present invention.

FIG. 1 is a sectional view showing a configuration of a liquid crystal display apparatus 100 in an embodiment 1 according to the present invention.

The liquid crystal display apparatus 100 of the present embodiment has a liquid crystal panel 200 and a backlight 300 as shown in FIG. 1. The components are described in order.

The liquid crystal panel 200 is of the active matrix type, and a TFT array substrate 201 and an opposing substrate 202 face each other in a spaced relationship from each other as shown in FIG. 1. A liquid crystal layer 203 is provided in such a manner as to be sandwiched between the TFT array substrate 201 and the opposing substrate 202.

As shown in FIG. 1, the backlight 300 is disposed in such a manner as to be positioned on the TFT array substrate 201 side of the liquid crystal panel 200, and illuminating light R emitted from the backlight 300 is irradiated upon the face of the TFT array substrate 201 on the opposite side to the face which opposes to the opposing substrate 202. Although details are hereinafter described, the liquid crystal panel 200 includes a pixel region PA in which a plurality of pixels (not shown) are disposed for displaying an image. The liquid crystal panel 200 receives the illuminating light R emitted from the backlight 300 installed on the rear face side of the liquid crystal panel 200 through a first polarizing plate 206 and modulates the illuminating light R received from the rear face thereof in the pixel region PA. Here, a TFT (not shown) is provided as a pixel switching element so as to correspond to each pixel on the TFT array substrate 201, and the pixel switching element (not shown) carries out switching control of a pixel to modulate the illuminating light R received from the rear face. Then, the modulated illuminating light R is emitted to the front face side through a second polarizing plate 207 so that an image is displayed in the pixel region PA. In short, the liquid crystal panel 200 of the present embodiment is of the transmission type, and a color image is displayed, for example, on the front face side of the liquid crystal panel 200.

In the present embodiment, the liquid crystal display apparatus 100 is, for example, of the normally black type, and various components such as the first polarizing plate 206 and the second polarizing plate 207 are disposed such that, when no voltage is applied to the liquid crystal layer 203 in the liquid crystal panel 200, the light transmittance drops to carry out black display, but when a voltage is applied to the liquid crystal layer 203, the light transmittance rises. In particular, the transmission axes of the components are disposed such that, when no voltage is applied to the liquid crystal layer 203, light is blocked by the second polarizing plate 207 to carry out black display, but when a voltage is applied to the liquid crystal layer 203, light is transmitted from the second polarizing plate 207.

Further, in the present embodiment, the liquid crystal display apparatus 100 is incorporated in a portable mobile apparatus, and an image displayed by light emitted through the liquid crystal layer 203 and the second polarizing plate 207 in the pixel region PA is visually observed by a user, who wears polarizing sunglasses each including a polarizing element having a transmission axis in the x direction or the y direction, through the polarizing elements in a state wherein the liquid crystal display apparatus 100 is in the landscape (horizontally long) orientation or the portrait (vertically long) orientation.

As shown in FIG. 1, the backlight 300 is opposed to the rear face of the liquid crystal panel 200, and emits the illuminating light R to the pixel region PA of the liquid crystal panel 200.

In particular, the backlight 300 is disposed so as to be positioned on the TFT array substrate 201 side from between the TFT array substrate 201 and the opposing substrate 202 which configure the liquid crystal panel 200. The backlight 300 irradiates the illuminating light R upon the face of the TFT array substrate 201 on the opposite side to the face which opposes to the opposing substrate 202. Here, for example, white light is irradiated as the illuminating light R. In short, the backlight 300 irradiates the illuminating light R so as to advance from the TFT array substrate 201 side toward the opposing substrate 202 side.

(Configuration of the Liquid Crystal Panel)

A general configuration of the liquid crystal panel 200 is described.

Figure 2:
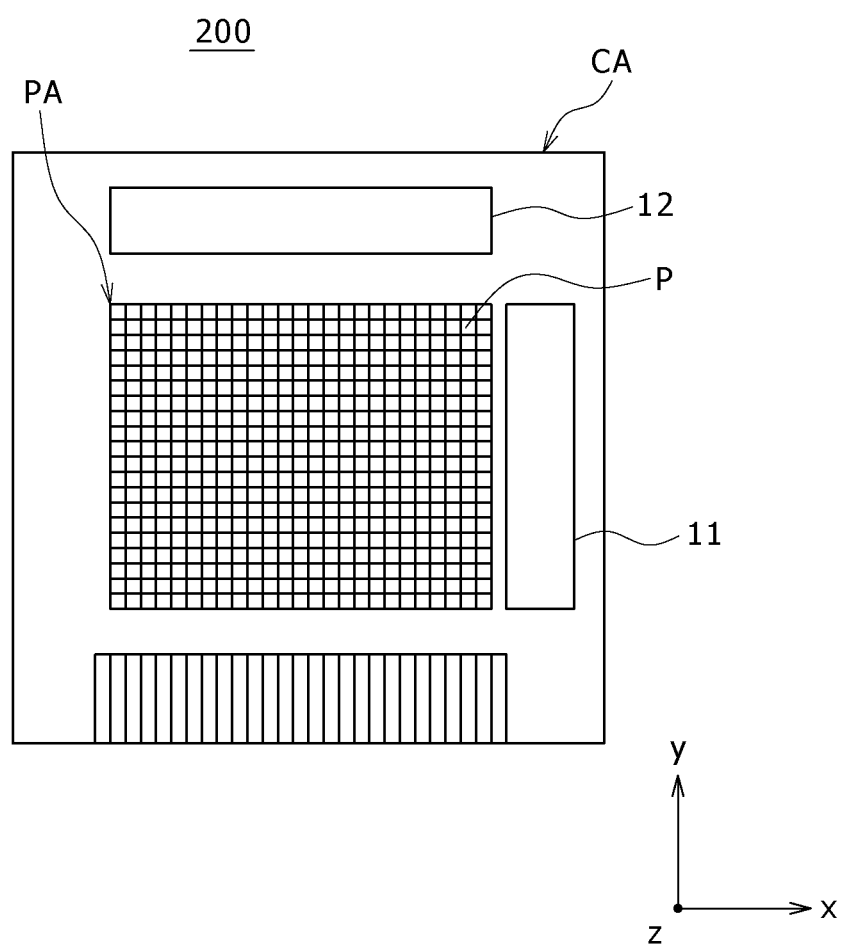
FIG. 2 is a plan view showing a liquid crystal panel 200 in the embodiment 1 according to the present invention.

FIG. 2 is a plan view showing the liquid crystal panel 200 in the embodiment 1 according to the present invention.

The liquid crystal panel 200 has the pixel region PA and a peripheral region CA as shown in FIG. 2.

In the pixel region PA of the liquid crystal panel 200, a plurality of pixels P are disposed along the face thereof as shown in FIG. 2. In particular, in the pixel region PA, a plurality of pixels P are disposed in a matrix such that they are juxtaposed in an x direction and a y direction which is perpendicular to the x direction. The pixels P are driven by a line-sequential method to display an image.

On the liquid crystal panel 200, the peripheral region CA is positioned so as to surround the periphery of the pixel region PA as shown in FIG. 2. In the peripheral region CA, a vertical driving circuit 11 and a horizontal driving circuit 12 are formed as shown in FIG. 2. For example, the vertical driving circuit 11 and the horizontal driving circuit 12 are configured from semiconductor elements formed similarly to the pixel switching elements described hereinabove. The vertical driving circuit 11 and the horizontal driving circuit 12 individually drive the plural pixels P provided in the pixel region PA, for example, by a line-sequential method to execute image display.

(Configuration of the Pixel Region of the Liquid Crystal Panel)

Figure 3:
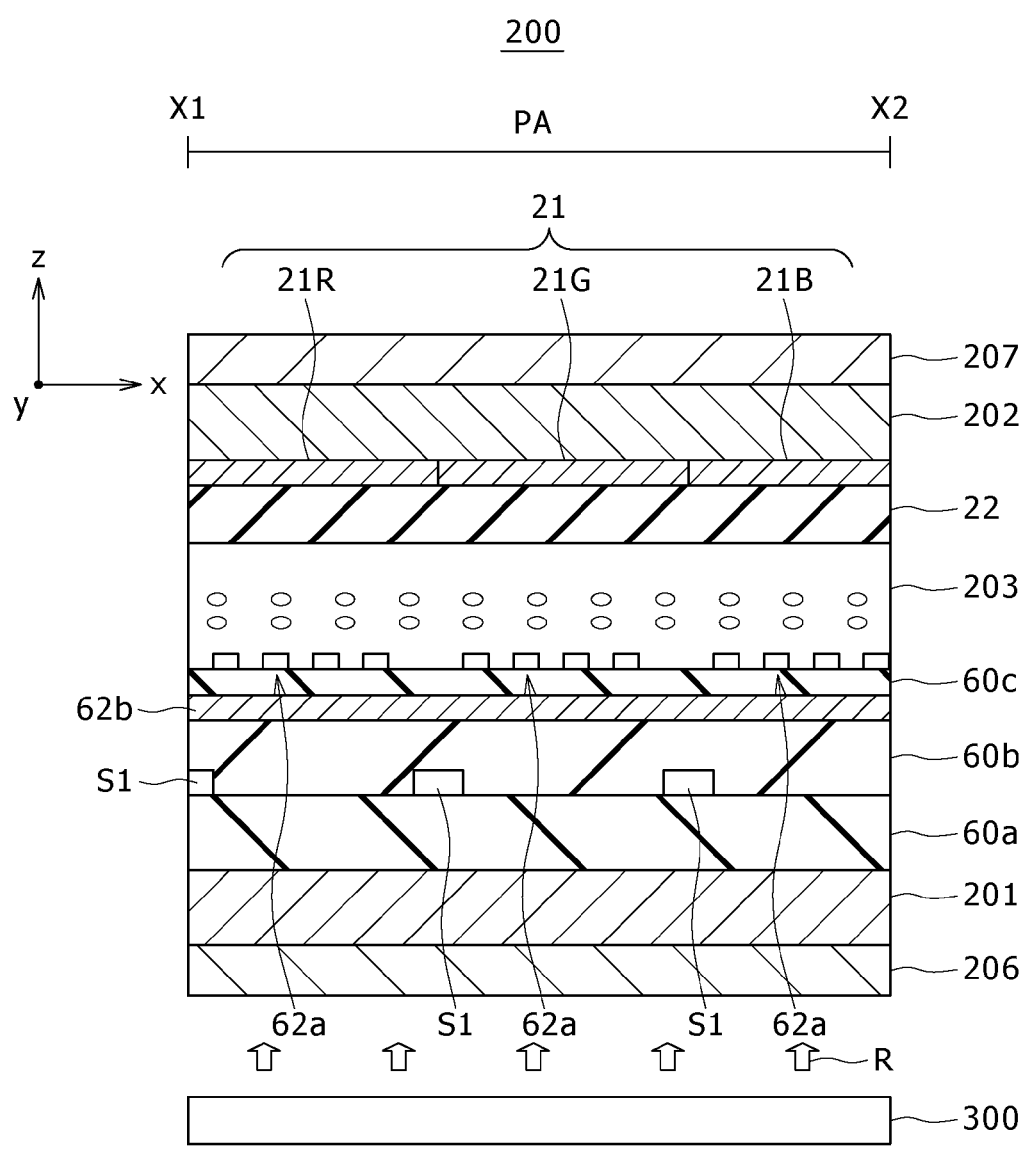
FIG. 3 is a sectional view schematically showing part of a pixel P provided in a pixel region PA of the liquid crystal panel 200 in the embodiment 1 according to the present invention.

FIG. 3 is a sectional view schematically showing part of a pixel P provided in the pixel region PA of the liquid crystal panel 200 in the embodiment 1 according to the present invention.

As shown in FIG. 3, the liquid crystal panel 200 has the TFT array substrate 201, opposing substrate 202, and liquid crystal layer 203. In the liquid crystal panel 200, the TFT array substrate 201 and the opposing substrate 202 are pasted to each other in a spaced relationship from each other as shown in FIG. 3, and the liquid crystal layer 203 is provided in the gap between the TFT array substrate 201 and the opposing substrate 202. For example, spacers (not shown) are interposed between the TFT array substrate 201 and the opposing substrate 202 such that the TFT array substrate 201 and the opposing substrate 202 are opposed to each other with a gap left therebetween and are pasted to each other using a seal material (not shown). In the present embodiment, the liquid crystal panel 200 is configured so as to be ready for a display mode of the FFS type.

In this liquid crystal panel 200, the TFT array substrate 201 is a substrate of an insulator which transmits light therethrough and is formed, for example, from glass. As shown in FIG. 3, pixel electrodes 62a, a common electrode 62b and data lines S1 are formed on a face of the TFT array substrate 201 which opposes to the opposing substrate 202.

Further, in the liquid crystal panel 200, the opposing substrate 202 is a substrate of an insulator which transmits light therethrough and is formed, for example, from glass similarly to the TFT array substrate 201. As shown in FIG. 3, the opposing substrate 202 opposes to the TFT array substrate 201 in a spaced relationship from each other. A color filter layer 21 is formed on a face of the opposing substrate 202 which opposes to the TFT array substrate 201 as shown in FIG. 3. Here, the color filter layer 21 includes a red filter layer 21R, a green filter layer 21G and a blue filter layer 21B such that the three primary colors of red, green and blue form one set.

Details of the TFT array substrate 201 which configure the liquid crystal panel 200 are described.

FIG. 4 is a plan view schematically showing part of the TFT array substrate 201 with regard to a pixel P provided in the pixel region PA in the embodiment 1 according to the present invention.

Referring to FIG. 4, different slanting lines are applied depending upon materials from which the individual members are configured as shown in a legend. It is to be noted that, while, in FIG. 4, subpixels corresponding to the red filter layer 21R in the pixel P shown in FIG. 3 are shown, also members of each of subpixels corresponding to the green filter layer 21G and blue filter layer 21B are formed similarly as in the case of the subpixel corresponding to the red filter layer 21R.

As shown in FIG. 4, in addition to the members shown in FIG. 3 of the pixel electrodes 62a, common electrode 62b and data lines S1, pixel switching elements 31 and gate lines G1 are formed on the TFT array substrate 201. The pixel switching elements 31 and the gate lines G1 are formed on a face of the TFT array substrate 201 which opposes to the opposing substrate 202.

Various portions provided on the TFT array substrate 201 are described successively.

On the TFT array substrate 201, through not shown in FIG. 3, the pixel switching elements 31 are formed on a face of the TFT array substrate 201 which opposes to the opposing substrate 202, and are covered with an interlayer insulating film 60a.

Figure 5:
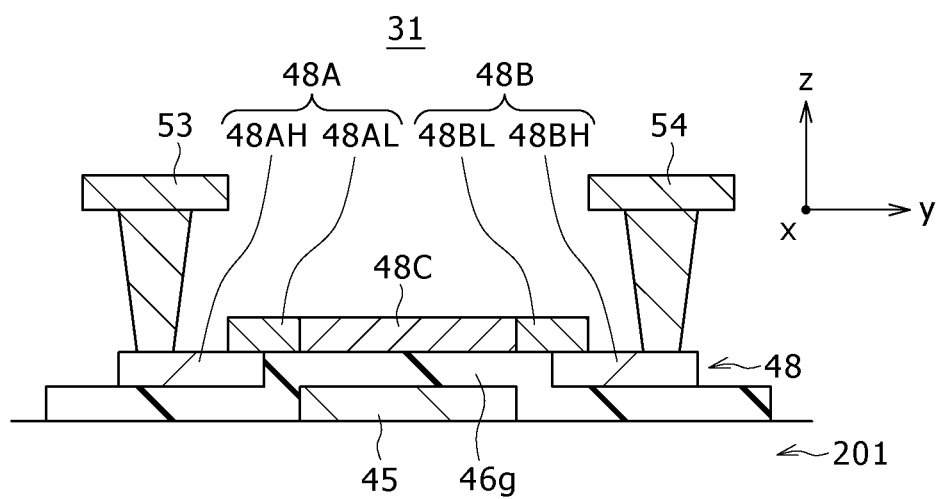
FIG. 5 is a sectional view showing a pixel switching element 31 in the embodiment 1 according to the present invention.

FIG. 5 is a sectional view showing a pixel switching element 31 in the embodiment 1 according to the present invention.

As shown in FIG. 5, the pixel switching element 31 includes a gate electrode 45, a gate insulating film 46g and a semiconductor layer 48 and is formed as a bottom gate type TFT of a LDD (Lightly Doped Drain) structure.

In particular, in the pixel switching element 31, the gate electrode 45 is provided on a face of the TFT array substrate 201 in such a manner as to oppose to a channel region 48C of the semiconductor layer 48 through the gate insulating film 46g as shown in FIG. 5. Here, the gate electrode 45 is formed using a metal material such as, for example, molybdenum as shown in FIG. 4.

Further, in the pixel switching element 31, the gate insulating film 46g is formed in such a manner as to cover the gate electrode 45 as shown in FIG. 5. Here, the gate insulating film 46g is formed using an insulating material such as a silicon oxide film or a silicon nitride film.

Further, in the pixel switching element 31, the semiconductor layer 48 has the channel region 48C formed thereon in such a manner as to correspond to the gate electrode 45 as shown in FIG. 5, and a pair of source-drain regions 48A and 48B are formed in such a manner as to sandwich the channel region 48C therebetween. The source-drain regions 48A and 48B in pair have a pair of low concentration impurity regions 48AL and 48BL formed thereon in such a manner as to sandwich the channel region 48C therebetween. Further, a pair of high concentration impurity regions 48AH and 48BH having a higher impurity concentration than the low concentration impurity regions 48AL and 48BL are formed in such a manner as to sandwich the low concentration impurity regions 48AL and 48BL therebetween. Here, the semiconductor layer 48 is formed using a semiconductor material such as, for example, polycrystalline silicon as shown in FIG. 4, and the source-drain regions 48A and 48B in pair are provided in a juxtaposed relationship in a direction perpendicular to the x direction along which the gate lines G1 extend such that the channel region 48C is sandwiched by the source-drain regions 48A and 48B.

In the pixel switching element 31, a source electrode 53 is provided so as to be electrically connected to the one source-drain region 48A while a drain electrode 54 is provided so as to be connected to the other source-drain region 48A. Further, as shown in FIG. 4, the source electrode 53 is connected to the data line S1 through a contact (not shown), and the drain electrode 54 is connected to the pixel electrode 62a through a contact (not shown). Here, the source electrode 53 and the drain electrode 54 are formed using a conductive material such as aluminum.

In the TFT array substrate 201, the pixel electrode 62a is formed on the face of the TFT array substrate 201 which opposes to the opposing substrate 202 as shown in FIG. 3.

Here, the pixel electrode 62a is provided, as shown in FIG. 3, on an insulating film 60c formed from an insulating material in such a manner as to cover the common electrode 62b on the TFT array substrate 201. For example, the pixel electrode 62a is formed on the insulating film 60c formed as a silicon nitride film. This pixel electrode 62a is provided so as to correspond to the red filter layer 21R, green filter layer 21G and blue filter layer 21B which configure the color filter layer 21 as shown in FIG. 3. The pixel electrode 62 is a so-called transparent electrode and is formed using, for example, ITO.

Meanwhile, the pixel electrode 62a is electrically connected to the drain electrode 54 of the pixel switching element 31 as shown in FIG. 4. The pixel electrode 62a generates a transverse electric field between the pixel electrode 62a and the common electrode 62b by a potential supplied thereto as an image signal from the pixel switching element 31 to apply a voltage to the liquid crystal layer 203.

In the present embodiment, since the liquid crystal panel 200 is of the FFS type, the pixel electrode 62a is formed in a comb-tooth shape in a direction of the xy face of the TFT array substrate 201 opposing to the opposing substrate 202 as shown in FIG. 4.

In particular, the pixel electrode 62a has a trunk portion 62ak and a branch portion 62ae as shown in FIG. 4.

In the pixel electrode 62a, the trunk portion 62ak extends in the x direction as shown in FIG. 4. Here, as shown in FIG. 4, a plurality of gate lines G1 extending in the x direction are juxtaposed in a spaced relationship from each other in the y direction, and two trunk portions 62ak are provided between the plural gate lines G1 juxtaposed in the y direction.

In the pixel electrode 62a, the branch portion 62ae is connected to the trunk portion 62ak and extends in a direction different from the x direction and the y direction and inclined with respect to the y direction as shown in FIG. 4. A plurality of such branch portions 62ae are disposed so as to be juxtaposed in a spaced relationship from each other in the x direction as shown in FIG. 4, and the plural branch portions 62ae are connected at one end portion thereof to the trunk portion 62ak and extend so as to be parallel to each other. In the present embodiment, a plurality of data lines S1 extending in a direction different from the x direction and the y direction and inclined with respect to the y direction are provided and juxtaposed in a spaced relationship from each other in the x direction as shown in FIG. 4. For example, four branch portions 62ae are provided between the plural gate lines G1 juxtaposed in the y direction. Further, the branch portions 62ae are formed so as to extend in the direction along which the data lines S1 extend. Here, the branch portions 62ae preferably extend in a direction inclined within an angular range equal to or greater than 2° but equal to or smaller than 45° with respect to the y direction, and in the present embodiment, the branch portions 62ae are inclined, for example, at an angle of 20°.

In the TFT array substrate 201, the common electrode 62b is formed on the face side of the TFT array substrate 201 which opposes to the opposing substrate 202 as shown in FIG. 3. Here, the common electrode 62b is provided on a flattening film 60b formed on the TFT array substrate 201. For example, the common electrode 62b is provided on the flattening film 60b formed from an organic compound such as an acrylic resin. The common electrode 62b is a so-called transparent electrode and is formed, for example, using ITO. The common electrode 62b opposes to the plural pixel electrodes 62a provided so as to correspond to the plural pixels P with the insulating film 60c interposed therebetween. In the present embodiment, since the liquid crystal panel 200 is of the FFS type, the common electrode 62b is formed solidly so as to cover the overall area of the pixel region PA in the direction of the xy plane of the TFT array substrate 201 opposing to the opposing substrate 202.

On the TFT array substrate 201, each data line S1 is formed on the face side of the TFT array substrate 201 which opposes to the opposing substrate 202 as shown in FIG. 3. Here, the data line S1 is provided on the interlayer insulating film 60a formed on the TFT array substrate 201.

As shown in FIG. 4, the data line S1 is formed using a metal material such as, for example, aluminum. The data line S1 is electrically connected to the source electrode 53 of the pixel switching element 31.

Further, a plurality of such data lines S1 are provided in a spaced relationship from each other in the x direction as shown in FIG. 4. Here, the plural data lines S1 are provided in a plurality of pixels P in such a manner as to define the plural pixels P juxtaposed in the x direction.

In the present embodiment, each data line S1 includes an inclined portion S1k, a horizontal portion S1x and a leader portion S1h as shown in FIG. 4, and the data lines S1 are formed in the plural pixels P so as to correspond to the plural pixels P juxtaposed in the y direction.

The inclined portion S1k of the data line S1 extends in a direction different from the x direction and the y direction and inclined with respect to the y direction in the pixel region PA as shown in FIG. 4. The inclined portion S1k of the data line S1 preferably extends in a direction inclined within an angular range equal to or greater than 2° but equal to or smaller than 45° in the pixel region PA similarly to the branch portion 62ae of the pixel electrode 62a, and in the present embodiment, the inclined portion S1k is inclined at an angle of, for example, 20°.

Further, the horizontal portion S1x of the data line S1 extends in the x direction in the pixel region PA as shown in FIG. 4. In particular, the horizontal portion S1x is connected to an upper end portion of the inclined portion S1k and extends to the left side in the x direction from the upper end portion as shown in FIG. 4. Further, the horizontal portion S1x is connected to a lower end portion of the inclined portion S1k of the data line S1 provided in a subpixel of another adjacent pixel P. In the present embodiment, the horizontal portion S1x is provided in an overlapping relationship with the gate line G1 provided so as to extend in the x direction as shown in FIG. 4.

Further, the leader portion S1h of the data line S1 is formed so as to draw a channel shape as shown in FIG. 4. In particular, the leader portion S1h first extends from the upper end portion of the inclined portion S1k to the upper side in the y direction in the pixel region PA, and extends to the right side in the x direction, and then extends to the lower side in the y direction until it is connected to the source electrode 53 of the pixel switching element 31.

On the TFT array substrate 201, though not shown in FIG. 3, the gate line G1 is formed on a face of the TFT array substrate 201 such that it is integrated with the gate electrode 45 shown in FIG. 5. In particular, the gate line G1 is electrically connected to the gate electrode 45 of the pixel switching element 31 as shown in FIG. 4 and formed on the face of the TFT array substrate 201 on the side which opposes to the opposing substrate 202, and is covered with the interlayer insulating film 60a shown in FIG. 3. Here, as shown in FIG. 4, the gate line G1 is formed using a metal material such as, for example, molybdenum. This gate line G1 extends in the x direction as shown in FIG. 4, and a plurality of such gate lines G1 are provided in a spaced relationship from each other in the y direction in such a manner as to define a plurality of pixels P juxtaposed in the y direction. The plural gate lines G1 are connected to the vertical driving circuit 11 shown in FIG. 1, and when image display is to be carried out, a scanning signal is supplied successively to the gate lines G1 to place the individual pixel switching elements 31 into an on state.

Details of the opposing substrate 202 which configures the liquid crystal panel 200 described above are described.

The color filter layer 21 provided on the opposing substrate 202 is formed on the face of the opposing substrate 202 which opposes to the TFT array substrate 201 as shown in FIG. 3. The color filter layer 21 is formed such that the three primary colors of red, green and blue make one set and includes a red filter layer 21R, a green filter layer 21G and a blue filter layer 21B. For example, each of the red filter layer 21R, green filter layer 21G and blue filter layer 21B is formed by applying application liquid containing a coloring pigment corresponding to the color and a photoresist material by a coating method such as a spin coating method to form a coating film and then carrying patterning working of the coating film by a lithography technique. Here, for example, a polyimide resin is used as the photoresist material. Each of the red filter layer 21R, green filter layer 21G and blue filter layer 21B is configured such that illuminating light R emitted from the backlight 300 is colored and transmitted from the TFT array substrate 201 side to the opposing substrate 202 side. In particular, the red filter layer 21R colors the white illuminating light R into red, the green filter layer 21G colors the illuminating light R into green, and the blue filter layer 21B colors the illuminating light R into blue, to transmit the illuminating light R therethrough.

Figure 6:
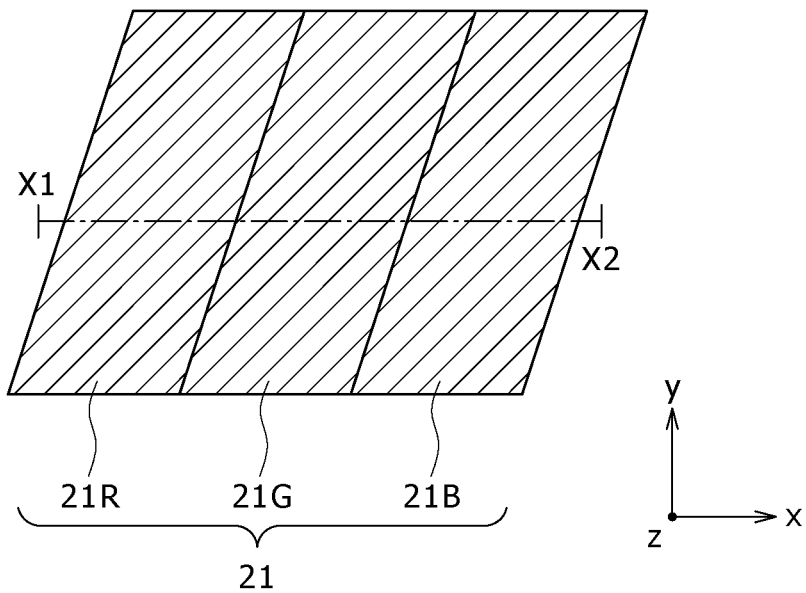
FIG. 6 is a plan view showing part of an opposing substrate 202 in the embodiment 1 according to the present invention.

FIG. 6 is a plan view showing part of the opposing substrate 202 in the embodiment 1 according to the present invention.

As shown in FIG. 6, the red filter layer 21R, green filter layer 21G and blue filter layer 21B which configure the color filter layer 21 are formed so as to be juxtaposed with each other in the x direction. Here, each portion is formed so as to correspond to the pixel electrode 62a described hereinabove, and in the present embodiment, the red filter layer 21R, green filter layer 21G and blue filter layer 21B extend in a direction inclined with respect to the y direction similarly to the branch portion 62ae of the pixel electrode 62a as shown in FIG. 6.

Details of the liquid crystal layer 203 which configures the liquid crystal panel 200 described above are described.

In the liquid crystal panel 200, the liquid crystal layer 203 is sandwiched between the TFT array substrate 201 and the opposing substrate 202 as shown in FIG. 3.

Further, the liquid crystal layer 203 is oriented by liquid crystal orientation films (not shown) formed on faces of the TFT array substrate 201 and the opposing substrate 202 which oppose to each other. The liquid crystal layer 203 is oriented such that the longitudinal direction of liquid crystal molecules extends along the direction of the xy face along which the TFT array substrate 201 and the opposing substrate 202 oppose to each other. Here, the liquid crystal layer 203 is configured using positive type liquid crystal.

In the present embodiment, the liquid crystal molecules of the liquid crystal layer 203 are oriented in a direction different from the x direction and the y direction in the pixel region PA and inclined with respect to the y direction. In particular, the liquid crystal molecules of the liquid crystal layer 203 are oriented so as to be inclined further, for example, by an angle $\theta$ of 5° from an angle by which the branch portion 62ae of the pixel electrode 62a and the inclined portion S1k of the data line S1 are inclined with respect to the y direction in the pixel region PA. In short, the liquid crystal layer 203 is subject to an orientation process by carry out a rubbing process setting the rubbing direction RH to an angle inclined, for example, by the angle $\theta$ of 5° with respect to the direction in which the branch portion 62ae of the pixel electrode 62a and the inclined portion S1k of the data line S1 extend in the pixel region PA as shown in FIG. 4. It is to be noted that the angle $\theta$ of the inclination with respect to the direction in which the branch portion 62ae of the pixel electrode 62a and the inclined portion S1k of the data line S1 extend in the pixel region PA preferably is within a range equal to or greater than 2° but equal to or smaller than 45°. Further, the first polarizing plate 206 is disposed on the light incoming side of the liquid crystal panel 200 such that the light transmission axis thereof corresponds to the orientation direction of the liquid crystal layer 203. Further, the second polarizing plate 207 is disposed on the light outgoing side of the liquid crystal panel 200 such that the light transmission axis thereof extends perpendicularly to the light transmission axis of the first polarizing plate 206.

As described above, in the present embodiment, the branch portion 62ae of the pixel electrode 62a extends in a direction different from the x direction and the y direction in the pixel region PA and inclined with respect to the y direction. Further, the liquid crystal molecules of the liquid crystal layer 203 are oriented similarly in a direction different from the x direction and the y direction in the pixel region PA and inclined with respect to the y direction.

Therefore, in the present embodiment, when a user wearing polarizing sunglasses including polarizing elements having an transmission axis coincident with the x direction or the y direction in the pixel region PA observes an image displayed in the pixel region PA through the polarizing elements, in any of the landscape state and the portrait state, the transmission axis along which light is transmitted through the polarizing elements is not different by a great amount from the transmission axis along which light is transmitted through the liquid crystal panel 200 and the second polarizing plate 207. Therefore, according to the present embodiment, the visibility when the user visually recognizes an image displayed on the screen is improved.

Further, in the present embodiment, also the inclined portion S1k of the data line S1 extends in a direction different from the x direction and the y direction in the pixel region PA and inclined with respect to the y direction similarly to the branch portion 62ae of the pixel electrode 62a. Here, the inclination angle of the branch portion 62ae of the pixel electrode 62a and the inclination angle of the inclined portion S1k of the data line S1 coincide with each other, and the branch portion 62ae of the pixel electrode 62a and the inclined portion S1k of the data line S1 extend along the same direction.

Therefore, according to the present embodiment, that a domain through which light is not transmitted is generated in the pixel region PA can be suppressed, and therefore, the light transmittance can be improved and the image quality can be improved.

Particularly, in the present embodiment, the inclined portion S1k of the data line S1 and the branch portion 62ae of the pixel electrode 62a extend in a direction inclined within an angular range equal to or greater than 2° but equal to or smaller than 45° with respect to the y direction in the pixel region PA. Where the inclination angle is smaller than 2°, the effects cannot sometimes be exhibited sufficiently, but where the inclination angle is greater than 45°, the light transmittance sometimes drops. Therefore, since the transmission axis along which light is transmitted through the polarizing element is not different by a great amount from the transmission axis along which light is transmitted through the liquid crystal panel 200 and the second polarizing plate 207, this is more preferable. It is to be noted that, where the transmission axes are inclined at the angle of 45° with respect to the y direction in the pixel region PA, this is most preferable because the transmission axes extend along an intermediate position between the landscape orientation and the portrait orientation in which the pixel region PA extends perpendicularly to that in the landscape orientation.

Further, in the present embodiment, a plurality of gate lines G1 are provided in a spaced relationship from each other in the x direction in the plural pixels P in such a manner as to define sub pixels of the plural pixels P juxtaposed in the x direction. Further, the plural data lines S1 are not formed so as to be connected to the plural pixels P juxtaposed in a direction inclined with respect to the y direction but are provided in a spaced relationship from each other in the y direction in the plural pixels P in such a manner as to define the plural pixels P juxtaposed in the y direction.

In short, while the center of gravity of the pixel is maintained, the branch portion 62ae of the pixel electrode 62a and the inclined portion S1k of the data line S1 are inclined in a direction different from the x direction and the y direction in the pixel region PA and inclined with respect to the y direction.

Therefore, according to the present embodiment, since it is unnecessary to separately carry out a signal process for converting a scanning signal and a data signal to allow display in accordance with the line sequential method, increase of the fabrication cost can be suppressed and improvement of the image quality can be implemented.

Embodiment 2

In the following, an embodiment 2 according to the present invention is described.

Figure 7:
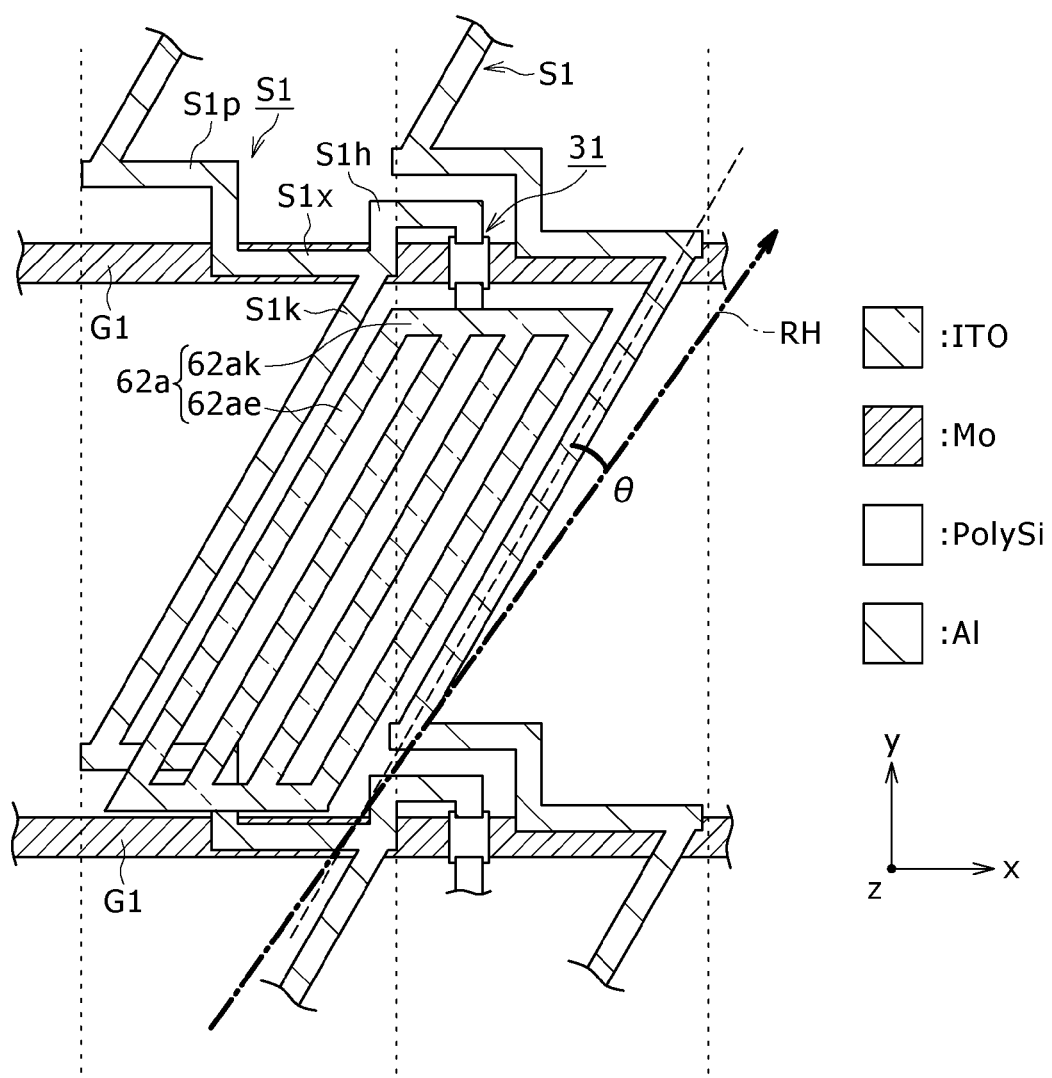
FIG. 7 is a plan view schematically showing part of a TFT array substrate 201 in a pixel P provided in a pixel region PA in an embodiment 2 according to the present invention.

FIG. 7 is a plan view schematically showing part of a TFT array substrate 201 with regard to a pixel P provided in a pixel region PA in the embodiment 2 according to the present invention.

The present embodiment is different from the embodiment 1 in the pixel electrode 62a and the data line S1 as shown in FIG. 7. Except this, the present embodiment is similar to the embodiment 1. Therefore, description of common components is omitted.

In the pixel electrode 62a in the present embodiment, the branch portion 62ae is formed so as to be inclined by an angle greater than that in the case of the embodiment 1 with respect to the y direction as shown in FIG. 7. For example, the branch portion 62ae is inclined by an angle of 30°.

Further, the data line S1 in the present embodiment includes a bent portion S1p in addition to an inclined portion S1k, a horizontal portion S1x and a leader portion S1h as shown in FIG. 7.

Although the inclined portion S1k of the data line S1 is formed similarly to that in the embodiment 1 as shown in FIG. 7, in the present embodiment, the inclined portion S1k is inclined at the angle of 30° with respect to the y direction in the pixel region PA similarly to the branch portion 62ae.

Further, the horizontal portion S1x of the data line S1 and the leader portion S1h of the data line S1 are formed similarly as in the embodiment 1 as shown in FIG. 7.

Further, as shown in FIG. 7, the bent portion S1p of the data line S1 is bent like a staircase in the x direction and the y direction in such a manner as to be spaced away from another data line S1 provided so as to correspond to a subpixel of an adjacent pixel P in the pixel region PA. In particular, the bent portion S1p extends to the upper side in the y direction from a left side end portion of the horizontal portion S1x in the pixel region PA, extends to the left side in the x direction from the point and is connected to a lower end portion of the inclined portion S1k of the data line S1 provided for another pixel P positioned adjacent thereto.

Figure 8:
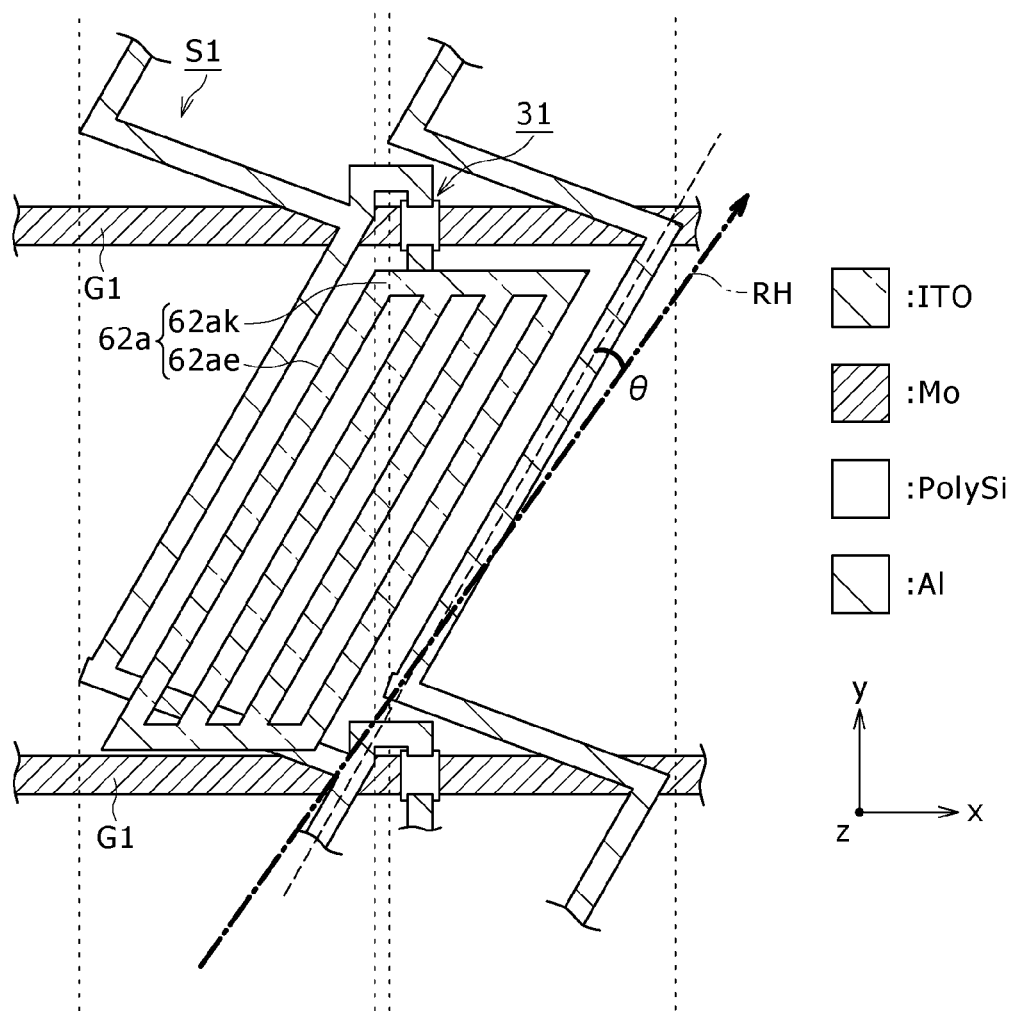
FIG. 8 is a plan view schematically showing part of the TFT array substrate 201 in the pixel P provided in the pixel region PA where a data line S1 is formed without providing a bent portion S1p in the embodiment 2 according to the present invention.

FIG. 8 is a plan view schematically showing part of the TFT array substrate 201 with regard to a pixel P provided in the pixel region PA where the data line S1 is formed without providing the bent portion S1p in the embodiment 2 according to the present invention.

In the case wherein the branch portion 62ae of the pixel electrode 62a is inclined by a great angle with respect to the y direction as in the present embodiment, where the data line S1 is formed without providing the bent portion S1p, it becomes likely to contact with another data line S1 provided so as to correspond to a subpixel of an adjacent pixel P in the pixel region PA. In this instance, a malfunction or the like occurs, and the image quality sometimes drops.

Therefore, in the present embodiment, the data line S1 is formed so as to include the bent portion S1p as shown in FIG. 7.

Accordingly, in the present embodiment, it is possible to incline the inclined portion S1k of the data line S1 and the branch portion 62ae of the pixel electrode 62a to an angle proximate to 45° with respect to the y direction in the pixel region PA. Further, since the restriction to the inclination angle disappears, the visibility can be improved further and it can be prevented readily that the data line S1 contacts with another data line S1, occurrence of the fault that the image quality deteriorates can be prevented.

Embodiment 3

In the following, an embodiment 3 according to the present invention is described.

Figure 9:
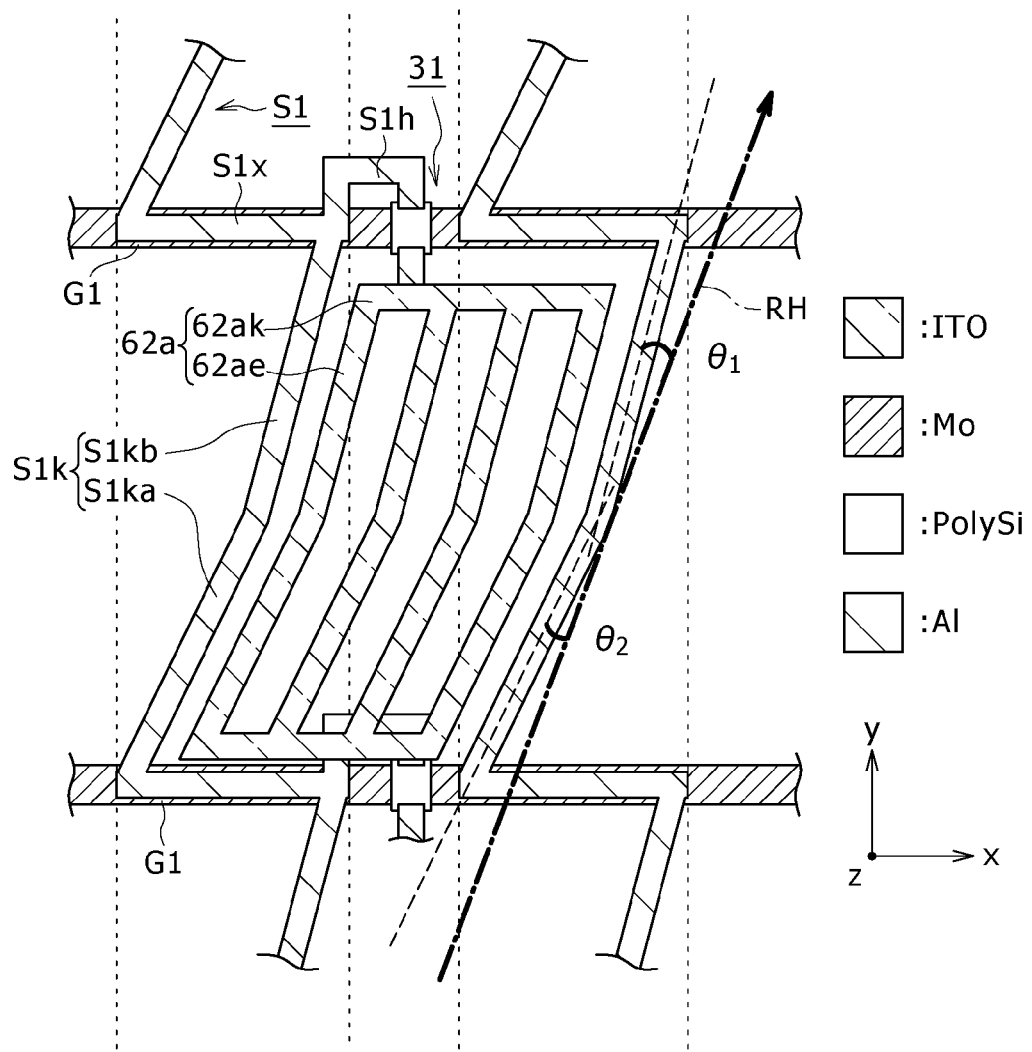
FIG. 9 is a plan view schematically showing part of a TFT array substrate 201 in a pixel P provided in a pixel region PA in an embodiment 3 according to the present invention.

FIG. 9 is a plan view schematically showing part of a TFT array substrate 201 with regard to a pixel P provided in a pixel region PA in the embodiment 3 according to the present invention.

The present embodiment is different from the embodiment 1 in the pixel electrode 62a and the data line S1 as shown in FIG. 9. Except this, the present embodiment is similar to the embodiment 1. Overlapping description of common components is omitted.

In the data line S1 in the present embodiment, the inclined portion S1k includes a first inclined portion S1ka and a second inclined portion S1kb as shown in FIG. 9.

Here, the first inclined portion S1ka extends in a direction different from the x direction and the y direction in the pixel region PA and inclined with respect to the y direction as shown in FIG. 9. This first inclined portion S1ka extends from a lower end portion to a central portion of the pixel P. Further, the first inclined portion S1ka preferably extends in a direction inclined within an angular range equal to or greater than 2° but equal to or smaller than 45° with respect to the y direction in the pixel region PA. In the present embodiment, the first inclined portion S1ka is inclined at an angle of, for example, 25°.

Meanwhile, the second inclined portion S1kb extends in a direction different from the x direction and the y direction in the pixel region PA and different from the extension direction in which the first inclined portion S1ka extends as shown in FIG. 9. This second inclined portion S1kb extends from a central portion to an upper end portion of the pixel P. This second inclined portion S1ka preferably extends in a direction inclined within an angular range equal to or greater than 2° but equal to or smaller than 45° with respect to the y direction in the pixel region PA. In the present embodiment, the second inclined portion S1kb is inclined by an angle of, for example, 15°.

Further, in the pixel electrode 62a in the present embodiment, the branch portion 62ae is formed so as to extend along a direction along which the first inclined portion S1ka and the second inclined portion S1kb of the inclined portion S1k extend as shown in FIG. 9. In short, the branch portion 62ae is inclined, within a range from a lower end portion to a central portion of the pixel P, at an angle of, for example, 25° with respect to the y direction similarly to the first inclined portion S1ka. Then, the branch portion 62ae is inclined, within a range from a central portion to an upper end portion of the pixel P, at an angle of, for example, 15° with respect to the y direction similarly to the second inclined portion S1kb.

Further, in the present embodiment, the liquid crystal layer 203 is subject to an orientation process by carrying out a rubbing process setting the rubbing direction to a direction inclined by an angle of 5° in absolute value with respect to the extension direction of the first inclined portion S1ka and the extension direction of the second inclined portion S1kb as shown in FIG. 9. In short, the liquid crystal layer 203 is subject to an orientation process by carrying out a rubbing process so that the angle θ1 between the extension direction of the first inclined portion S1*ka* and the rubbing direction and the angle θ2 between the extension direction of the second inclined portion S1*kb* and the rubbing direction may be equal to each other (in short, θ1=θ2).

By providing the components in such a manner as described above, in the present embodiment, the liquid crystal panel 200 is formed so as to have a dual domain structure.

As described above, the liquid crystal panel 200 in the present embodiment has a dual domain structure wherein two domains are included in a pixel P, and the inclined portion S1*k* of the data line S1 includes the first inclined portion S1*ka* and the second inclined portion S1*kb* whose inclination angles with respect to the y direction are different from each other and the first inclined portion S1*ka* and the second inclined portion S1*kb* are provided so as to correspond to one pixel P in the pixel region PA. Further, the branch portion 62*ae* of the pixel electrode 62*a* is formed such that it extends along a direction along which the first inclined portion S1*ka* and the second inclined portion S1*kb* extend.

Therefore, since, in the present embodiment, that a domain through which light is not transmitted appears in the pixel region PA can be suppressed similarly as in the embodiment 1, the light transmittance can be improved and the image quality can be improved.

Embodiment 4

In the following, an embodiment 4 according to the present invention is described.

Figure 10:
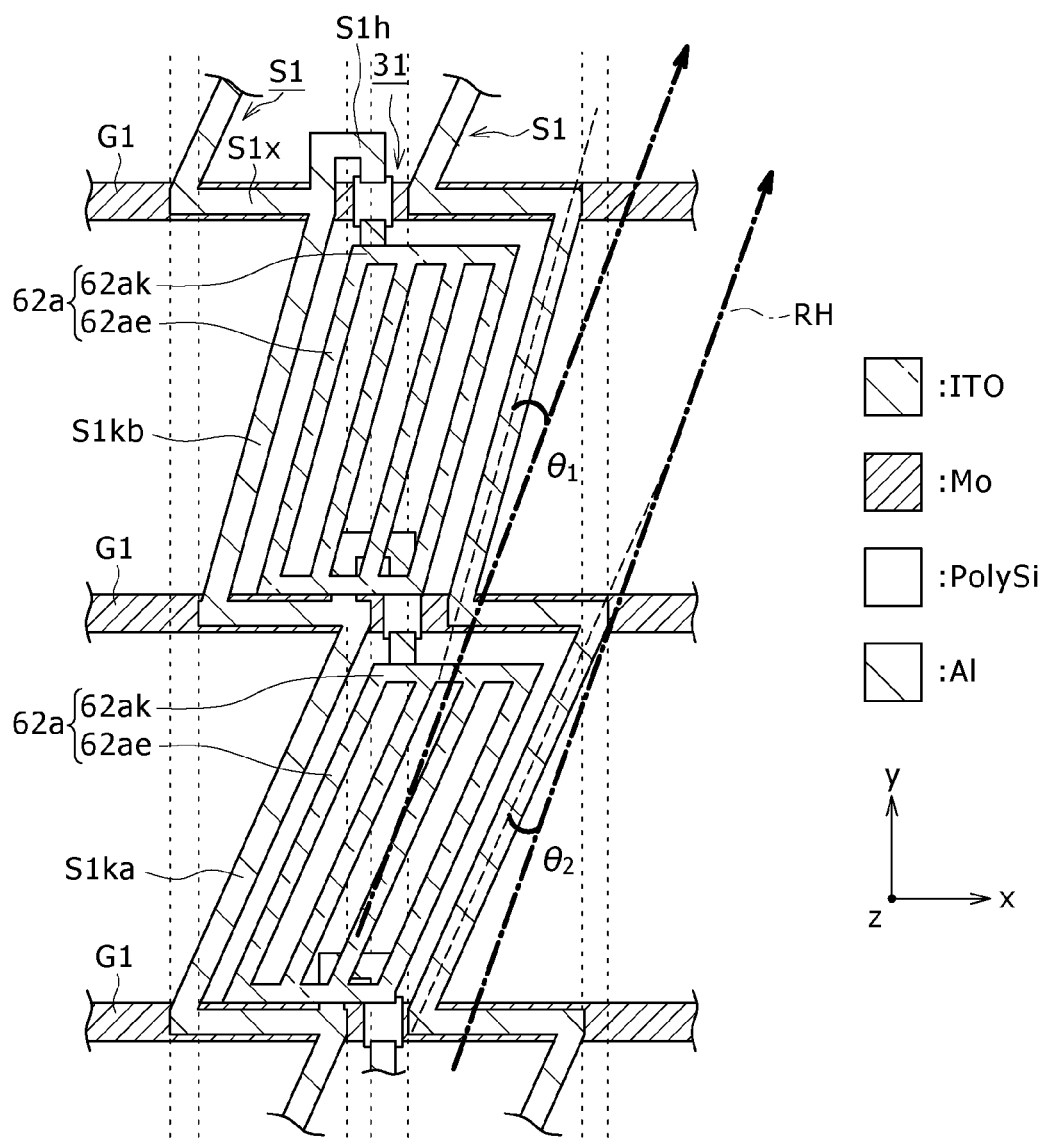
FIG. 10 is a plan view schematically showing part of a TFT array substrate 201 in a pixel P provided in a pixel region PA in an embodiment 4 according to the present invention.
Figure 11:
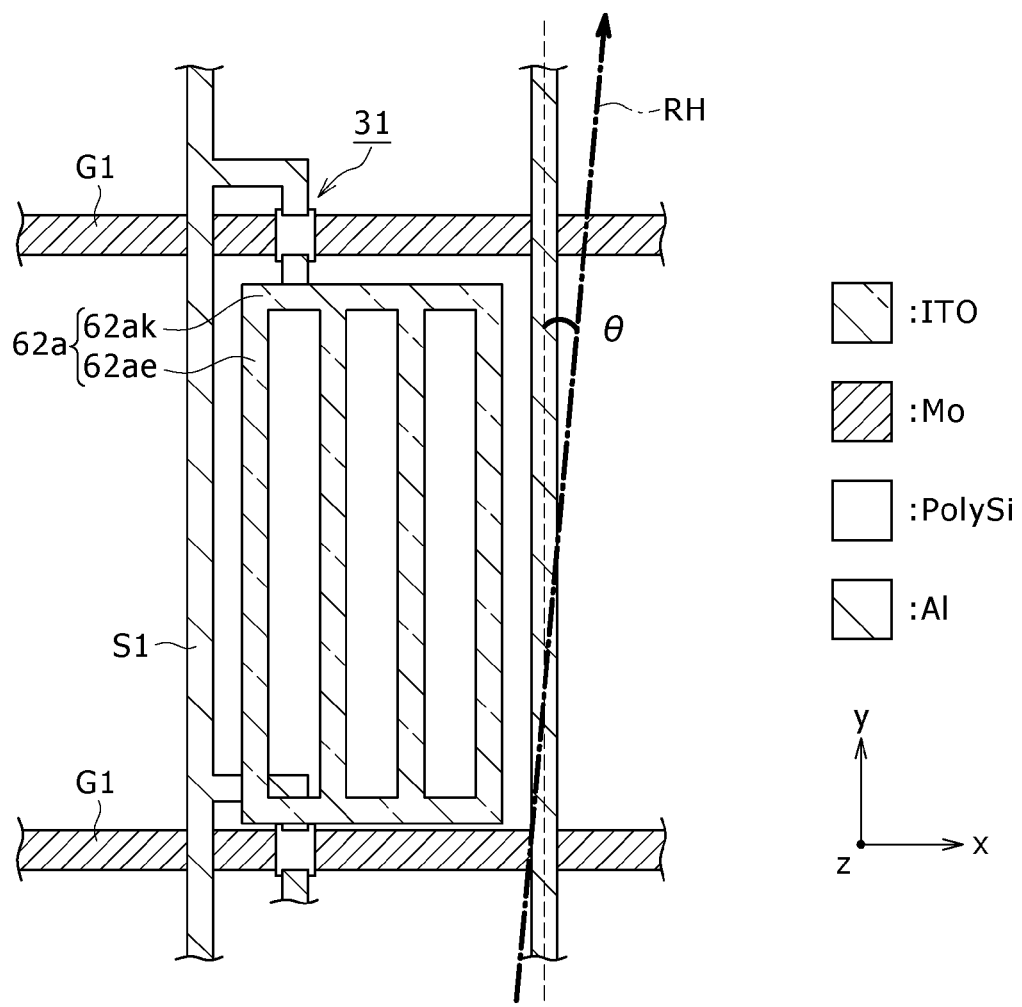
FIG. 11 is a plan view schematically showing part of a pixel provided in a pixel region in a liquid crystal display apparatus of the FFS type.

FIG. 10 is a plan view schematically showing part of a TFT array substrate 201 with regard to a pixel P provided in a pixel region PA in the embodiment 4 according to the present invention. FIG. 10 shows two pixels P provided in an even-numbered row and an odd-numbered row among the pixels P juxtaposed in the y direction.

The present embodiment is different from the embodiment 1 in a pixel electrode 62*a* and a data line S1 as shown in FIG. 10. Except this, the present embodiment is similar to the embodiment 1. Therefore, overlapping description of common components is omitted.

In the data line S1 in the present embodiment, the inclined portion S1*k* of the data line S1 includes a first inclined portion S1*ka* and a second inclined portion S1*kb* as shown in FIG. 10.

Here, the first inclined portion S1*ka* is provided in those of the pixels P juxtaposed in the y direction which belong to one of an even-numbered row and an odd-numbered row. For example, the first inclined portion S1*ka* is provided so as to correspond to an odd-numbered row. Further, the first inclined portion S1*ka* extends in a direction different from the x direction and the y direction in the pixel region PA and inclined with respect to the y direction. This first inclined portion S1*ka* extends, for example, from a lower end portion to an upper end portion of a pixel P in an odd-numbered row. Further, the first inclined portion S1*ka* preferably extends in a direction inclined within an angular range equal to or greater than 2° but equal to or smaller than 45° with respect to the y direction in the pixel region PA. In the present embodiment, the first inclined portion S1*ka* is inclined at an angle of, for example, 25°.

Meanwhile, the second inclined portion S2*kb* is provided on those of the pixels P juxtaposed in the y direction which belong to one of an even-numbered row and an odd-numbered row as shown in FIG. 10. For example, where the first inclined portion S1*ka* is provided so as to correspond to an odd-numbered row, the second inclined portion S2*kb* is provided so as to correspond to an even-numbered row. Further, the second inclined portion S1*kb* extends in a direction different from the x direction and the y direction in the pixel region PA and different from the extension direction in which the first inclined portion S1*ka* described above extends. This second inclined portion S1*kb* extends, for example, from a lower end portion to an upper end portion of a pixel P in an even-numbered row. Further, this second inclined portion S1*kb* preferably extends in a direction inclined within an angular range equal to or greater than 2° but equal to or smaller than 45° with respect to the y direction in the pixel region PA. In the present embodiment, the second inclined portion S1*kb* is inclined at an angle of, for example, 15°.

Further, in the pixel electrode 62*a* of the present embodiment, the branch portion 62*ae* is formed so as to extend along the direction in which the first inclined portion S1*ka* and the second inclined portion S1*kb* of the inclined portion S1*k* extend. In particular, the branch portion 62*ae* is inclined, in a pixel P which corresponds to an odd-numbered row from among a plurality of pixels P juxtaposed in the y direction, at an angle of, for example, 25° with respect to the y direction similarly to the first inclined portion S1*ka*. Further, the branch portion 62*ae* is inclined, in a pixel P which corresponds to an even-numbered row from among the plural pixels P juxtaposed in the y direction, at an angle of, for example, 15° with respect to the y direction similarly to the second inclined portion S1*kb*.

Further, in the present embodiment, the liquid crystal layer 203 is subject to an orientation process by carrying out a rubbing process in a direction inclined at an angle of 5° in absolute value with respect to the extension direction of the first inclined portion S1*ka* and the extension direction of the second inclined portion S1*kb*. In short, the liquid crystal layer 203 is subject to an orientation process by carrying out a rubbing process so that the angle θ1 between the extension direction of the first inclined portion S1*ka* and the rubbing direction and the angle θ2 between the extension direction of the second inclined portion S1*kb* and the rubbing direction may be equal to each other (in short, θ1=θ2).

By providing the components in such a manner as described above, in the present embodiment, the liquid crystal panel 200 is formed so as to have a pseudo dual domain structure.

As described above, the liquid crystal panel 200 in the present embodiment has a pseudo dual domain structure wherein domains are different between two different pixels P adjacent each other, and the inclined portion S1*k* of the data line S1 includes the first inclined portion S1*ka* and the second inclined portion S1*kb* whose inclination angles with respect to the y direction are different from each other. Further, the first inclined portion S1*ka* and the second inclined portion S1*kb* are disposed such that they are juxtaposed alternately with each other in a plurality of pixels P juxtaposed in the y direction in the pixel region PA. Further the branch portion 62*ae* of the pixel electrode 62*a* is formed such that it extends in the direction in which the first inclined portion S1*ka* and the second inclined portion S1*kb* extend.

Therefore, since, in the present embodiment, that a domain through which light is not transmitted appears in the pixel region PA can be suppressed similarly as in the embodiment 1, the light transmittance can be improved and the image quality can be improved.

In carrying out the present invention, the present invention is not limited to the embodiments described above, but various modified forms can be adopted.

For example, while, in the embodiments described above, the gate line G1 is formed so as to extend in the x direction while the data line S1 is not formed so as to extend in the y direction but is formed in an inclined relationship, the present invention is not limited to this. Similar effects can be achieved also where, for example, the gate line G1 is not formed so as to extend in the x direction but is formed in an inclined relationship while the data line S1 is formed so as to extend along the y direction. Also where the gate line G1 is formed in an inclined relationship with respect to the x direction and the data line S1 is formed in an inclined relationship with respect to the y direction, similar effects can be achieved.

Further, for example, in the embodiments described above, the branch portion 62ae of the pixel electrodes 62a is formed so as to extend along the direction along which the inclined portion S1k of the data line S1 extends. In short, it is described that the inclination angle of the inclined portion S1k of the data line S1 and the inclination angle of the branch portion 62ae of the pixel electrode 62a are made coincide with each other. However, the present invention is not limited to this, and the inclination angle of the data line S1 and the inclination angle of the branch portion 62ae of the pixel electrode 62a may not coincide with each other. However, in order to suppress appearance of a domain through which light is not transmitted, it is preferable to make the inclination angle of the inclined portion S1k of the data line S1 and the inclination angle of the branch portion 62ae of the pixel electrode 62a coincide with each other. Further, while, in the embodiments described above, positive type liquid crystal is used for the liquid crystal layer 203, the present invention is not limited to this, and negative type liquid crystal may be used for configuration of the liquid crystal layer 203. In this instance, the present invention can be applied by reversing the orientation axis by 90°. For example, in FIG. 4, a direction, for example, inclined downwardly by an angle of 5° with respect to the x direction is used as the orientation direction (rubbing direction).

Further, for example, in the present embodiment, the pixel switching element 31 described above is configured as a thin film transistor of the bottom gate type, the present invention is not limited to this. For example, the pixel switching element 31 may be configured using a thin film transistor of the top gate type.

Further, for example, in the embodiments described above, the present invention is applied to the FFS type, the present invention is not limited to this. For example, the present invention can be applied, for example, to the IPS (In-Plane-Switching) type.

Further, the liquid crystal display apparatus 100 of the present embodiment can be applied as a part of various electronic apparatus. For example, the liquid crystal display apparatus 100 can be applied to such electronic apparatus as a digital still camera and a video camera.

It is to be noted that, in the embodiments described above, the liquid crystal display apparatus 100 corresponds to the display apparatus of the present invention. Further, in the embodiments described above, the liquid crystal panel 200 corresponds to the display panel in the present invention. Further, in the embodiments described above, the liquid crystal layer 203 corresponds to the liquid crystal layer in the present invention. Further, in the embodiments described above, the pixel electrode 62a corresponds to the pixel electrode in the present invention. Further, in the embodiments described above, the trunk portion 62ak corresponds to the trunk portion in the present invention. Further, in the embodiments described above, the branch portion 62ae corresponds to the branch portion in the present invention. Further, in the embodiments described above, the common electrode 62b corresponds to the common electrode in the present invention. Further, in the embodiments described above, the gate line G1 corresponds to the first wire line in the present invention. Further, in the embodiments described above, the data line S1 corresponds to the second wire line in the present invention. Further, in the embodiments described above, the inclined portion S1k corresponds to the inclined portion in the present invention. Further, in the embodiments described above, the first inclined portion S1ka corresponds to the first inclined portion in the present invention. Further, in the embodiments described above, the second inclined portion S1kb corresponds to the second inclined portion in the present invention. Further, in the embodiments described above, the x direction corresponds to the first direction in the present invention. Further, in the embodiments described above, the y direction corresponds to the second direction in the present invention. Further, in the embodiments described above, the pixel region PA corresponds to the pixel region in the present invention. Furthermore, in the embodiments described above, the pixel P corresponds to the pixel in the present invention.

The invention claimed is:

1. A liquid crystal display apparatus comprising:
a liquid crystal panel having a pixel region in which a plurality of pixels are provided in a matrix in a first direction and a second direction perpendicular to the first direction;
a pixel electrode and a common electrode that apply a transverse electric field to a liquid crystal layer such that an image is displayed in said pixel region with light emitted through said liquid crystal layer;
a plurality of first wire lines disposed in a spaced relationship from each other in the second direction with regard to the plurality of pixels so as to define a plurality of pixels juxtaposed in the second direction;
a plurality of second wire lines disposed in a spaced relationship from each other in the first direction with regard to the plurality of pixels so as to define a plurality of pixels juxtaposed in the first direction; and
a color filter layer comprising a red filter layer, a green filter layer and a blue filter layer juxtaposed with each other in the first direction,
wherein,
(a) each of said second wire lines includes an inclined portion extending in a direction different from the first and second directions in said pixel region and inclined with respect to the second direction,
(b) said pixel electrode includes (1) two trunk portions extending in the first direction, (2) a plurality of branch portions extending in a third direction in said pixel region, each of the plurality of branch portions inclined in a same direction, and (3) each end of the plurality of branch portions connected to a respective trunk portion,
(c) each of said inclined portion and said branch portions is inclined in the same direction with respect to the second direction,
(d) the common electrode is formed over an entire display region including all of the pixel regions,
(e) the red filter layer, the green filter layer and the blue filter layer each extend in an incline in the same direction as the second direction and aligned with the branch portions, and
(f) the inclined portion of the second wire is formed on the side opposite to the pixel electrode with respect to the common electrode in a direction of thickness of the liquid crystal panel.

2. The liquid crystal display apparatus according to claim 1, wherein the branch portions extend parallel to the inclined portions of said second wire lines.

3. The liquid crystal display apparatus according to claim 2, wherein each of the inclined portions of said second wire lines and the branch portions extends in a direction inclined within an angular range equal to or greater than 2° but equal to or smaller than 45° with respect to the second direction in said pixel region.

4. The liquid crystal display apparatus according to claim 3, wherein each of the inclined portions of said second wire lines and the branch portions extends in a direction inclined at the angle of 45° with respect to the second direction in said pixel region.

5. The liquid crystal display apparatus according to claim 4, wherein each of the second wire lines includes a bent portion bent like a staircase in the first direction and the second direction so as to be spaced away from another second wire line provided so as to correspond to another adjacent pixel in said pixel region.

6. The liquid crystal display apparatus according to claim 3, wherein each of the inclined portions of said second wire lines includes:
   a second inclined portion extending in a third direction different from the first and second directions; and
   a third inclined portion extending in a fourth direction different from the first, second and third directions,
   wherein
      said second inclined portion and said third inclined portion are formed so as to correspond to one pixel in said pixel region.

7. The liquid crystal display apparatus according to claim 2, wherein each of the inclined portions of said second wire lines includes:
   a second inclined portion extending in a third direction different from the first and second directions; and
   a third inclined portion extending in a fourth direction different from the first, second and third directions,
   wherein,
      said second inclined portion and said third inclined portion are disposed alternately in the plurality of pixels juxtaposed in the second direction in said pixel region.

8. The liquid crystal display apparatus according to claim 1, wherein one of said trunk portions is located at an end portion of said pixel electrode and is shifted in the first direction with respect to the other trunk portion located at the other end portion of said pixel electrode.

9. The liquid crystal display apparatus according to claim 1, wherein said pixel electrode has a shape of a parallelogram whose angles are not a right angle.

* * * * *